March 19, 1963     H. S. McCONKIE     3,081,810
SAFETY INNER TUBE WITH MEANS FOR SECURING SAME TO WHEEL RIM
Original Filed July 28, 1958     3 Sheets-Sheet 1

INVENTOR
Howard S. McConkie
BY
ATTORNEY

March 19, 1963  H. S. McCONKIE  3,081,810
SAFETY INNER TUBE WITH MEANS FOR SECURING SAME TO WHEEL RIM
Original Filed July 28, 1958  3 Sheets-Sheet 2

INVENTOR
Howard S. McConkie
BY
ATTORNEY

INVENTOR
HOWARD S. Mc CONKIE
BY
ATTORNEY

United States Patent Office 3,081,810
Patented Mar. 19, 1963

3,081,810
SAFETY INNER TUBE WITH MEANS FOR
SECURING SAME TO WHEEL RIM
Howard S. McConkie, 101 Etter St., Hot Springs, Ark.
Original application July 28, 1958, Ser. No. 751,533, now
Patent No. 3,012,600, dated Dec. 12, 1961. Divided
and this application Mar. 17, 1961, Ser. No. 96,517
14 Claims. (Cl. 152—350)

This invention relates to tires and more particularly to improved tubes of the inner or safety types, together with improved means and methods for mounting such tubes in a wheel assembly.

This application is a division of Application Serial No. 751,533, filed July 28, 1958, now Patent No. 3,012,600, December 12, 1961, for: Safety Inner Tube With Means for Securing Same to Wheel Rim and Wheel Assembly Therewith.

The automobile and truck wheel rims in common use are of four types; the removable edge rim, the split rim, the clincher rim, and the drop center rim. Of these, the first two named are so constructed that an inner tube can be mounted on the rim without stretching and when inflated, consequently fits the rim closely and tightly. The last two named types of rims, however, require stretching of the inner tube over the outwardly extending rim flanges which seat or seal the tire. With these types of rims, particularly the drop center, the fit of the inner tube against the rim, even when inflated, is loose enough to permit sudden movement and creep. The relative movement of the tube with respect to the rim and the tire, particularly at high speeds, or when the tire bumps into obstacles such as a curbstone, causes chafing and wear of the tube or safety member, tends to pull out the valve stem and destroys the wheel balance, setting up vibrations which endanger the comfort and safety of the vehicle passengers.

To avoid these objections and to protect the tube or safety member from pinching and undue wear at the rim flanges and tire beads, it has been suggested that reinforced tire safety members be used and that these be cemented or otherwise permanently secured to the rim. Such practice has the obvious disadvantage that once the tire is punctured and repair is necessary, the safety member or tube must be destroyed in an effort to dismount the tire and tube for their repair.

It is the primary object of the invention to provide a safety member or inner tube which is large enough to easily mount on any type rim, which is tightly but removably secured to the rim in such manner as to prevent or reduce displacement, chafing and imbalance, and which is reinforced to minimize wear but is nevertheless capable of expanding to fill the tire and render safety in the event of blowout of the tire without sacrificing the comfort and other qualities of the ride and performance of the tire.

Another object is to provide a reinforced, safety tube which is securely positioned within a tire to retain its balance and stability, enabling the tire to run smoothly without objectionable vibration, and which is yet removable to permit dismounting, repair and reuse of the tube.

A further object is to provide a safety tube for tubeless type tires which is easy to mount and secure to the rim and to inflate, and which enables the tire itself to be more easily mounted and inflated.

Still another object is to provide an inner tube, portions of which are reinforced with nonextensible material as protection against chafing, and yet is capable of expansion to entirely fill a tire upon inflation to provide optimum operational riding qualities.

A still further object is to provide a safety tube for tires whose inner circumference is reinforced with nonextensible material to protect against pinching by tire mounting arms, and against chafing by tire edges or rim flanges when installed.

Yet another object is to provide a safety tube whose inner circumference is larger than the rim circumference, and having means for shortening the tube circumference to fit closely about and removably clamp the wheel rim.

A still further object is to provide a safety tube for tubeless tires having nonextensible reinforced portions which do not prevent the tube from expanding to fit the entire inner surface of the tire upon puncture thereof.

The novel features that are considered characteristic of the invention are set forth with particularity in the appended claims. The invention itself, however, both as to its organization and its method of operation, together with additional objects and advantages thereof, will best be understood from the following description of several embodiments when read in connection with the accompanying drawings, wherein like reference characters indicate like parts throughout the several figures and in which:

Figure 1:
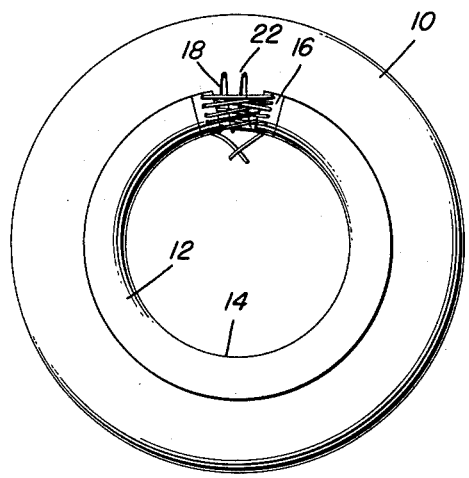
FIG. 1 is a plan view of an inner tube constructed according to the invention with a nonextensible reinforcing portion and means to shorten the inner circumference of the tube.
Figure 2:
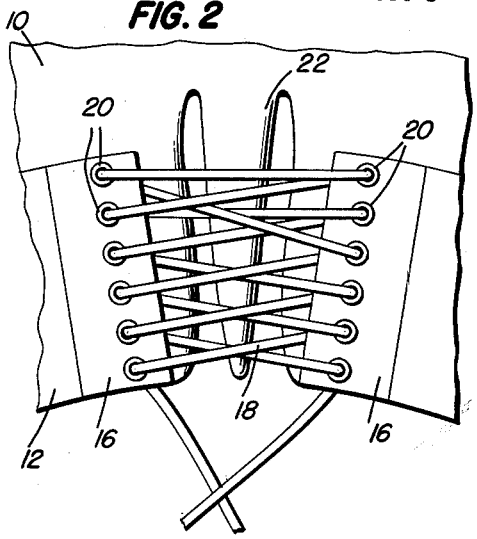
FIG. 2 is an enlarged fragmentary plan view of the tube circumference shortening means.

Referring now to the drawings, FIGS. 1–4 illustrate a tube, constructed in accordance with the invention, which can be easily slipped over a tire rim of any common variety without stretching and which may then be secured firmly and closely to the rim to prevent undesired relative motion when used as a safety member in a tubeless type tire.

Figure 3:
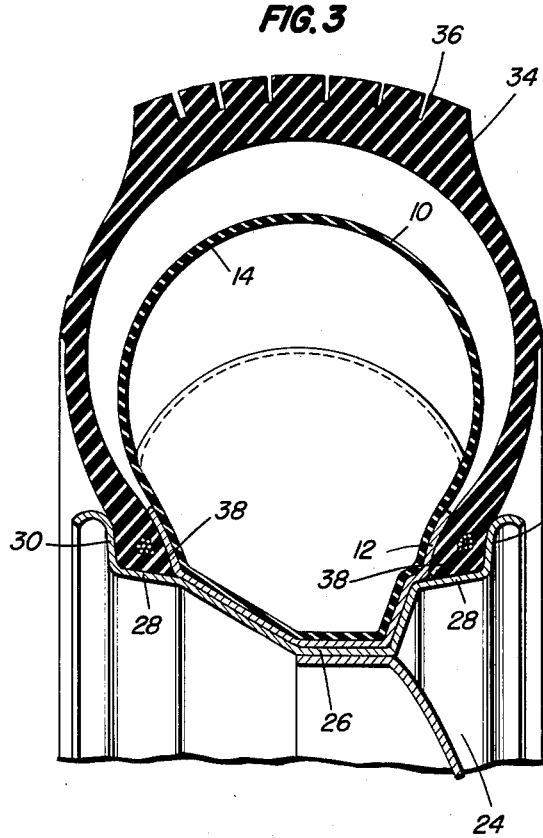
FIG. 3 is a transverse cross section of a tubeless type tire mounted on a drop center rim, and enclosing the tube of FIG. 1.
Figure 4:
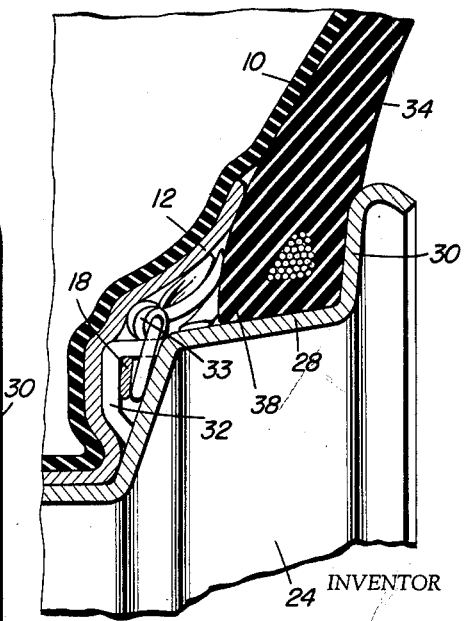
FIG. 4 is a fragmentary enlarged section illustrating the securement of the tube circumference shortening means to the rim.

The tube 10 is made with an internal diameter 14 large enough to fit easily over the normal sized rim whether it be of the drop center type or any other, without the need for stretching the rubber to mount the tube. Preferably, the tube 10 is provided with a fiber or fabric belly 12 which may be rubber impregnated and formed integrally or secured by cement, vulcanization or by other suitable means to the tube. The reinforcement member 12 protects the tube at such times as the tube becomes operational for supporting the vehicle on leakage or puncture of the tire 36, and at other times from the pressure of the tire bead edges 38. For this reason, the reinforcement member desirably extends around the transverse cross section of the tube to at least or slightly above the level of the tire bead, as illustrated in FIG. 3.

To shorten the tube and prevent it from creeping, a pair of spaced straps 16 are attached to the reinforcement member 12 and each is provided with a plurality of eyelets 20. A strong lace 18 of cord or wire is threaded through the eyelets. To secure the tube to the rim, lacing 18 is tightened to the maximum extent possible causing the tube and protective member 12 to buckle or fold, as indicated at 22. The ends of the lace are then passed through an optionally provided projecting loop shaped member 32 which is welded or otherwise secured to the inner surface of the rim 24. When pulled tight, lace 18 is tied, as at 33, to firmly anchor the shortened tube to the rim and forcefully prevent any creeping or other relative movement thereof. One or more short springs may be used to connect the eyelets. The illustrated tire 34 comprises the usual tread 36 and beaded edges 38 which seat in the rim flanges 28 and 30 with air sealing contact. Preferably, separate rim and tube valves, not shown, are provided for inflation of the tire and the tube. The tube valve stem as well as the rim valve stem must make air sealing passage through the rim as disclosed in copending application, Serial No. 717,624, filed February 26, 1958, now Patent No. 3,038,516.

The fabric reinforcement 12 on tube 10 completely fills the drop center 26 of rim 24 and extends above the level of the bottom of the tire beads 38. Fabric reinforcement can be substantially limited to that portion of the tube that contacts the depth of the rim channel. As illustrated in FIG. 3, the tube 10 is holding about the same air volume as is the tire. Tube 10 was fully expanded to complete the mounting of this tubeless type tire. The tube pressure was then adjusted so that it contained about one-half the air pressure that is desired in the tire during its operation. Air pressure was then added to the tire and, as this pressure exceeds the pressure in the tube, the tube is compressed as shown. The air volume in the tube, after the mounting process, is retained in the tube but is compressed and has naturally increased its pressure to equal that in the tire. Tube 10, as shown, acts as a safety member for tire 34. Upon loss of air in the tire, tube 10 will expand to entirely fill the space within the tire in spite of the non-extensible portion 12. The tube and tire will rotate as a unit, the tube acting to carry the vehicle for an indefinite period of time provided the cause of the tire leak is not such as will also puncture the tube.

In mounting the wheel assembly, the inside tire bead is first positioned properly on the rim. The uninflated tube 10 is then easily passed over the rim flanges 30 and the lacing 18 pulled tight to forcefully contract the inner periphery of the tube and hold it tightly against the rim circumference with the tube valve stem extended through the rim. When this has been done, the ends of the lace 18 are passed through the member 32 and tied at 33 to securely anchor the tube to the rim 24. The outer tire bead is then mounted on the rim, surrounding the tube, and inflating air or fluid is fed to tube 10 through the valve stem to force the tire beads 38 outwardly into air sealing contact with the rim flanges 28, 30. Thus, the need for compression tools to squeeze the periphery of the tire and force the tire flanges into air sealing contact with the rim flanges is avoided.

To remove the tire and tube for repair or other purposes, after removing all air pressure from the tire, and tube, the tire outer bead is removed from the rim, and the knot 33 in lace 18 is untied. The lacing is loosened to permit separation of the straps 16 and lengthening of the tube's inner circumference.

Once this has been done, the deflated inner tube will slip easily off the rim. The tire inner or second bead is then dismounted. The tube may be repaired and reused any number of times by mounting in the manner described above.

Figure 5:
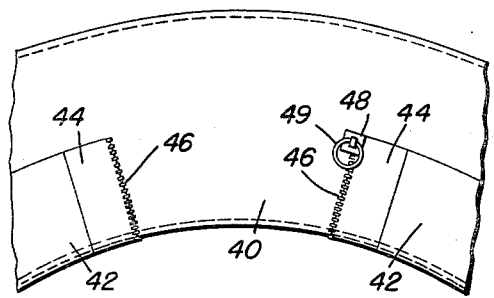
FIG. 5 is a fragmentary plan view similar to FIG. 2 showing a modified tube provided with different shortening and rim securement means.
Figure 6:
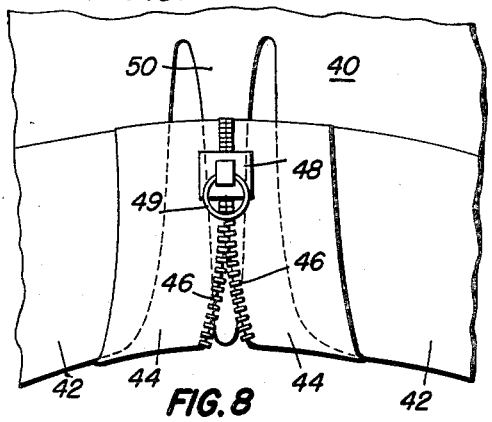
FIG. 6 is a view similar to FIG. 5 showing the shortening means partially operated.
Figure 10:
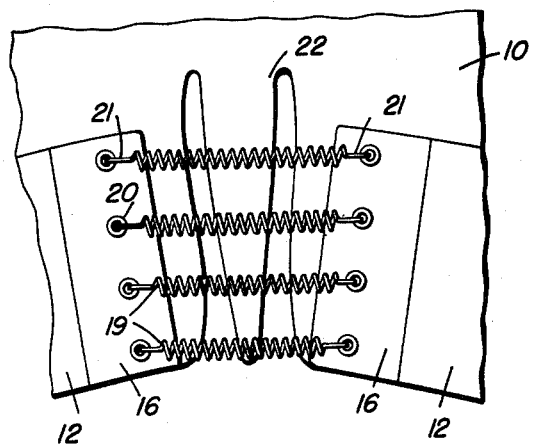
FIG. 10 is a fragmentary view, similar to FIG. 2, showing a modified tube circumference shortening means.

The means for shortening the inner circumference of the tube and securing the tube to the rim is not restricted to the described lacing and eyelet construction. Hooks may be used or individual coil springs 19, FIG. 10, having a hook 21 at each end to slip into an eyelet 20. As illustrated in FIGS. 5 and 6, a zipper may be used as the fastening means. In FIG. 5, the rubber tube 40 is provided at its belly with a fabric reinforcing liner 42 similar to that shown at 12 in FIG. 1. However, the nonextensible liner does not completely surround the inner circumference of the tube, but has spaced ends provided with flaps 44 on which are mounted zipper interlocking elements 46 and a zipper slide 48. In FIG. 6, the tube 40 is shown in partial state of fastening with the zipper locking slide 48 partly operated to engage some of the zipper teeth 46. Operation of the zipper causes the rubber between the reinforcing material ends to fold or buckle as illustrated at 50. The slide fastener 48, once it has been operated to shorten the tube, may be fastened in its closed position by threading a lace or cord through a keeper ring 49 and tieing the lace to a projection on the rim as described in connection with FIG. 4.

Figure 8:
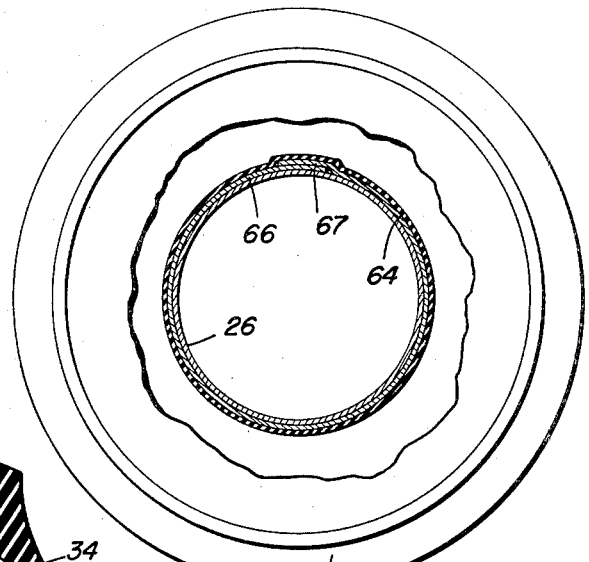
FIG. 8 is a partial section taken on line 8—8 of FIG 7.
Figure 7:
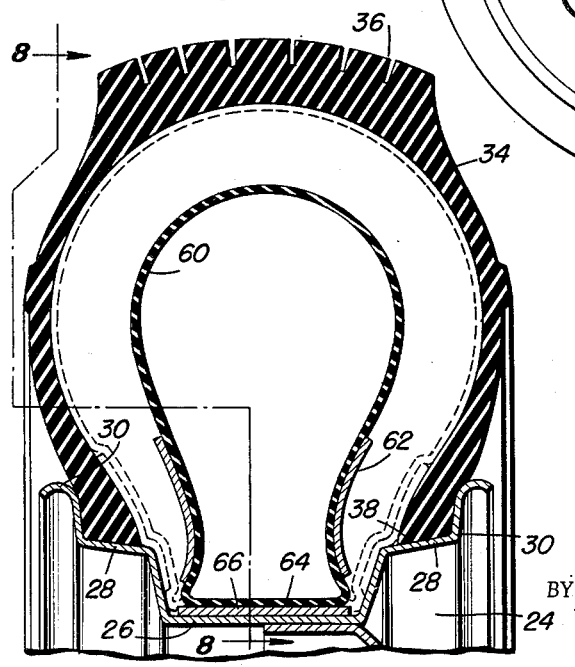
FIG. 7 is a transverse section of a tire similar to FIG. 3, but showing a modified embodiment of a safety tube in full lines after completion of mounting and in dotted lines during the mounting.
Figure 9:
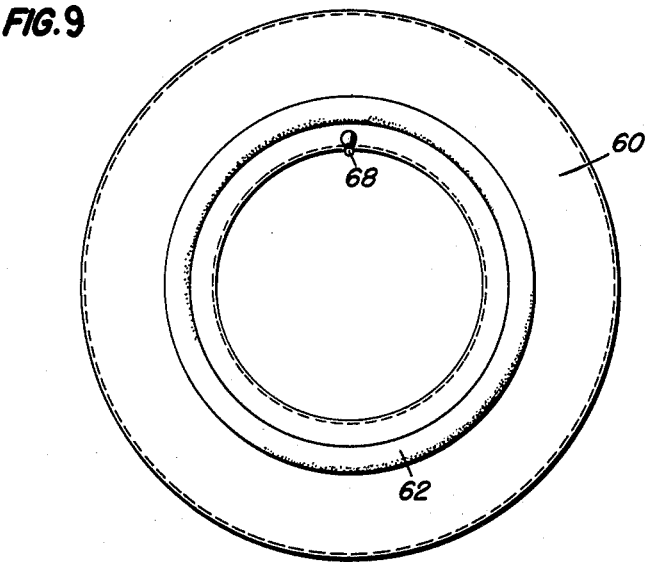
FIG. 9 is a plan view of the inner tube alone of FIG. 7.

In FIGS. 7–9 is illustrated another embodiment of the invention in which other portions of the tube are provided with nonextensible reinforcement members and a different means for securing the tube to the rim is employed. In FIG. 7, the modified tube 60 is shown in full lines installed as a safety member in a tubeless type tire 34 on a drop-center rim 24 having outwardly projecting rim flanges 28, 30. The broken line illustration of tube 60 indicates the capability of the tube for entirely filling the space within the tire 34 during mounting and/or when the tire is punctured or leaks during use.

At each side of the rubber tube 60 is an annular reinforcing portion 62 of nonextensible fabric or similar material, FIG. 9, which lies in the area of the tire beaded edges 38 and the supporting rim flange, FIG. 7. Portions 62 protect the tube against undue wear and chafing from the rim and tire edges when the tube becomes operational to support the vehicle on leakage of the tire, as shown in broken lines in FIG. 7. The annular reinforcing portions 62 are separated, at the inner circumference of the tube, by the extensible tube portion 64 which is inflatable to completely fill the drop center 26 of the rim 24. The outer portion of the tube 60 is also extensible so that it can expand to fill the entire tire space. To hold the tube firmly to the rim, there is provided a ribbon or tape 66 which may overlap at 67 for a short distance of its length, see FIG. 8. At least one side, the outer side, of tape 66 is coated with an adhesive which, upon inflation of tube 60, will adhere to the surface of the tube portion 64. The adherence of the tape at the overlap 67 serves to hold the tape closely to the rim 24 and, as a result, the tube 60 is firmly held in the drop center 26 and against the rim 24 while the wheel rotates.

In mounting the wheel assembly of FIG. 7, the tape with its adhesive face outwardly is first applied to the circumference of the drop center 26 of the rim 24. The inner bead of the tire is next positioned properly on the rim. The uninflated tube 60 is then inserted over the rim and the outer tire bead mounted around the tube and on the rim. Inflation of the tube 60, through its valve stem, which makes an airtight seal with the rim 24, serves to expand the inner tube and forces its lower portion 64 into adhesive engagement with the tape 66. The outer portion of the inner tube 60 will force the tire beads 38 into air sealing engagement with the rim flanges 28, 30 so that the tire may then be inflated. To dismount the wheel assembly, the tire and tube are deflated, one bead of the tire is taken off the rim, the tube may then be removed by merely severing the adhesive tape. After repair, the tube may be reinstalled on the same or different rim by using the same or another strip of adhesive tape 66. If desired, the adhesive strip may have both faces coated with adhesive material so that the strip will adhere more securely to the rim.

Each of the described means and methods of mounting will firmly secure the tube to the rim during use on a vehicle in motion in spite of centrifugal forces, but permits the ready removal of the tube for repair, and reuse of the tube after repair. Tubes may be balanced when manufactured, or the mounted tire, tube, wheel rim assembly balanced before or after inflation by any accepted means of the trade.

Although certain specific embodiments of the invention have been shown and described, it is obvious that many modifications thereof are possible. The invention, therefore, is not to be restricted except insofar as is necessitated by the prior art and by the spirit of the appended claims.

What is claimed and desired to be secured by Letters Patent is:

1. In combination with a tire and a wheel rim having outwardly extending flanged sides to receive the edges of the tire, a separate distensible tube capable of filling the entire space within the tire and mounted on the rim and within the tire, said tube having nonextensible reinforcing portions, and means on the outer surface of said reinforcing portions for removably securing the inner perimeter of said tube tightly to the rim over a substantial portion of the rim periphery by shortening the rim engaging periphery of the tube.

2. The combination according to claim 1 wherein said means for removably securing said tube to the rim comprises, spaced flaps having eyelets therein and connected to each other by lacing in the eyelets, and the ends of the tightened lacing being fastened to a portion of said rim.

3. The combination according to claim 1 wherein said means for removably securing the tube to the rim comprises, spaced flaps on the nonextensible reinforcing material, said flaps being provided with a zipper fastening means for reducing the peripheral length of the inner tube.

4. The combination according to claim 1 wherein said means for removably securing said tube to the rim comprises, flaps secured to said nonextensible material at its spaced ends and having eyelets therein, said eyelets being connected to each other by tightened lacing in the eyelets, and the ends of the tightened lacing being fastened to a portion of said rim.

5. The combination according to claim 1 wherein the inner periphery of said tube is reinforced with nonextensible fabric partially encircling the tube periphery, and the said means for removably securing the tube to the rim comprises, spaced flaps on the ends of the nonextensible fabric, said flaps being provided with a zipper fastening means for reducing the peripheral length of the inner tube.

6. The combination according to claim 1 wherein said means for removably securing said tube to the rim compries, spaced flaps having eyelets therein and connected to each other by lacing in the eyelets, and the ends of the tightened lacing being fastened together.

7. The combination according to claim 1 wherein said means for removably securing the tube to the rim comprises, spaced flaps on the nonextensible reinforcing material, said flaps having eyelets therein, and elastic means for drawing said eyelets toward each other to reduce the peripheral length of the inner tube.

8. The combination according to claim 7 wherein said elastic means for drawing said eyelets toward each other comprise a plurality of coil springs.

9. The combination according to claim 2 wherein said means for removably securing said tube to the rim further comprises means fixed to and projecting from said rim in the tube seating space between said rim flanges to which last named means the ends of said tightened lacing are fastened.

10. The combination according to claim 9 wherein said means projecting from said rim comprises an eyelet formed on the rim.

11. In combination with a tubeless type tire and a wheel rim having outwardly extending flanged sides to receive the edges of the tire in air sealing engagement, a distensible tube mounted on the rim and within the tire, said tube being inflated to occupy less than the volume of the tire during normal driving conditions but capable of filling the entire space within the tire during mounting and on leakage of the tire, said tube having at least one nonextensible reinforcing portion and means on the outer surface of said reinforcing portion for removably securing the inner perimeter of said tube tightly to the rim over a substantial portion of the rim periphery whereby upon leakage of the tire said tube is expanded to completely fill the tire and relative circumferential movement between the tube and both the rim and tire is prevented.

12. As an article of manufacture, a doughnut shaped tube adapted to be mounted on a wheel rim and inflated to entirely fill a tire, said tube being formed of extensible material and having at least one reinforcing portion including a length of nonextensible material secured to the outer surface of said tube near its rim engaging periphery, and means on the outer surface of said nonextensible material for shortening the rim engaging periphery of the tube for clamping the tube to a rim.

13. An article of manufacture according to claim 12 wherein the ends of said nonextensible material are spaced apart, a flap being secured at each end, and said flaps having eyelets for reception of lacing to pull said ends toward each other.

14. An article of manufacture according to claim 12 wherein said means for shortening the tube comprises a pair of spaced flaps secured to said nonextensible material and means for drawing said flaps together.

References Cited in the file of this patent

UNITED STATES PATENTS

| 517,415 | Ames | Mar. 27, 1894 |
| 596,701 | Griswold | Jan. 4, 1898 |
| 616,516 | Wilson | Dec. 27, 1898 |
| 1,428,570 | Wayne | Sept. 12, 1922 |
| 1,432,398 | King et al. | Oct. 17, 1922 |
| 1,482,901 | Levin | Feb. 5, 1924 |
| 2,150,648 | Eger | Mar. 14, 1939 |
| 2,607,392 | Snyder | Aug. 19, 1952 |
| 2,802,504 | Lyon | Aug. 13, 1957 |

FOREIGN PATENTS

| 2,274 | Great Britain | of 1891 |